Patented Jan. 25, 1927.

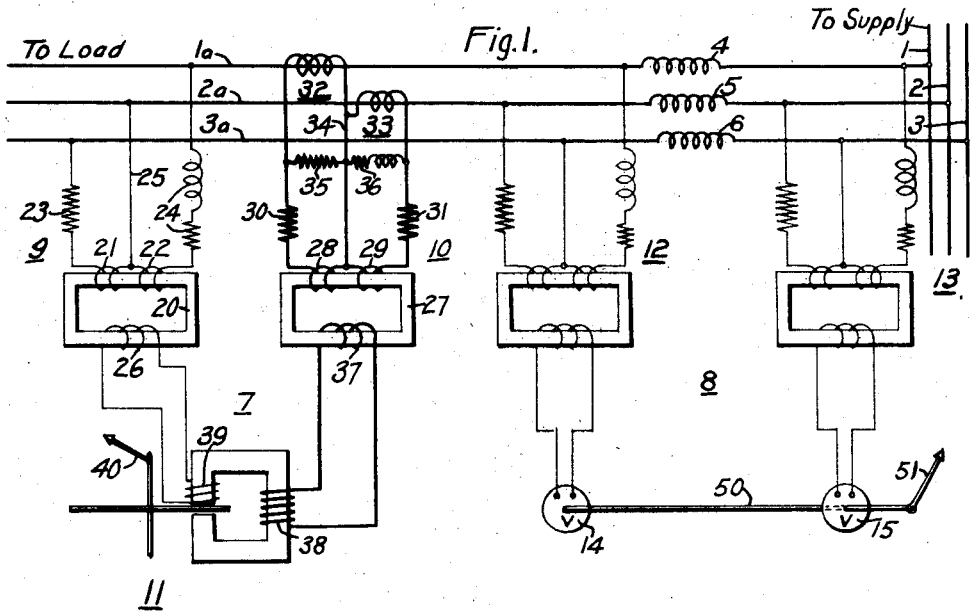
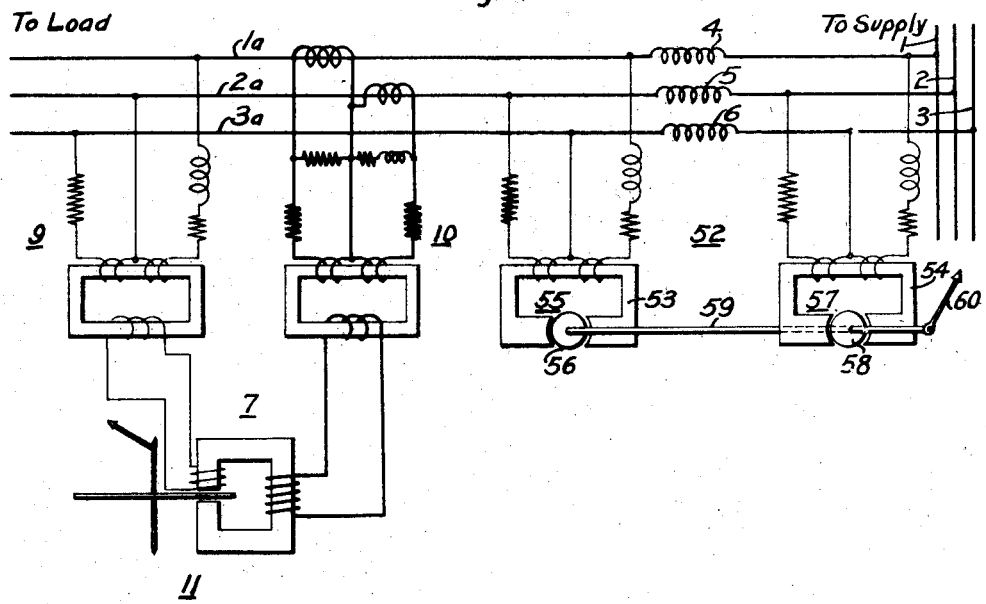

1,615,691

UNITED STATES PATENT OFFICE.

CHARLES LE G. FORTESCUE AND ROBERT D. EVANS, OF PITTSBURGH, PENNSYLVANIA, ASSIGNORS TO WESTINGHOUSE ELECTRIC AND MANUFACTURING COMPANY, A CORPORATION OF PENNSYLVANIA.

MEASURING SYSTEM.

Application filed January 7, 1922. Serial No. 527,551.

Our invention relates to electrical measuring instruments and systems and it has special relation to the measurement of the unbalanced load in an electrical circuit.

In practising our invention we utilize the broad principles of indicating the symmetrical components of the unbalanced quantities of an electrical system disclosed and claimed in the patent issued upon a copending application of Charles Le G. Fortescue, Lewis W. Chubb and Joseph Slepian, No. 1,535,593, dated April 28, 1925, and also in the patent issued upon a copending application of Robert D. Evans, No. 1,535,587, dated April 28, 1925, which are assigned to the Westinghouse Electric & Manufacturing Company.

In the first-mentioned patent to Fortescue et al., the general principles of the measurement of the symmetrical components of the unbalanced currents or voltages of an unbalanced polyphase circuit are described and broadly claimed. In the second patent, the specific component-segregating means utilized in this application is disclosed and claimed.

It has been discovered that any unbalanced polyphase system of electrical quantities may be resolved into two or more symmetrical systems. These quantities, for example, may be resolved into a positive-phase-sequence component, a negative-phase-sequence component and a zero-phase-sequence component. In a three-phase three-wire system, the zero-phase-sequence component is of zero value and only the positive and the negative-phase-sequence components need be considered.

One object of our invention is to provide a measuring device for unbalanced polyphase systems embodying means for indicating the unbalance of an electrical load and also associated means for indicating whether the load is increasing or decreasing the degree of unbalance of the system.

Other objects of our invention will become evident from the following detailed description taken in conjunction with the accompanying drawing, Fig. 1 of which is a diagrammatic view of a measuring device and system organized in accordance with our present invention, and Fig. 2 is a diagrammatic view of a modification of the system shown in Fig. 1.

Referring to Fig. 1 of the drawing, the system here shown comprises a plurality of supply-circuit conductors 1, 2 and 3 and of load-circuit conductors $1^a$, $2^a$ and $3^a$, a plurality of equal impedance devices, such as reactors or transformers 4, 5 and 6, being connected to the respective conductors 1, 2 and 3 and separating the supply circuit proper from the load circuit, as indicated by the corresponding legends. A device 7 is provided for indicating the degree of unbalance of the load circuit, while a second device 8 is adapted to indicate whether the unbalance of the load circuit tends to correct or aggravate the unbalance of the system taken as a whole.

The device 7 comprises a positive-phase-sequence-device 9 which is energized in accordance with the positive-phase-sequence component of the voltage of the load circuit, whereas the accompanying device 10 is energized in accordance with the negative-phase-sequence component of the current of the load circuit. A watt-meter device 11, or the like, is energized from the positive and negative phase-sequence devices 9 and 10, as hereinafter more fully set forth.

The positive phase-sequence device 9 comprises a core member 20, one leg of which is provided with a plurality of transformer coils 21 and 22. A resistor 23 serves to connect the outer terminal of the coil 21 with the load-circuit conductor $3^a$ while a combined resistor and reactor 24 connects the outer terminal of the other coil 22 to the load-circuit conductor $1^a$. The impedances 23 and 24 are equal and have such characteristics that the currents traversing the same are in phase under balanced circuit conditions. The remaining load-circuit conductor $2^a$ is connected directly by a conductor 25 to a point intermediate the coils 21 and 22. Another leg of the transformer 20 is provided with a secondary coil 26 for a purpose to be set forth.

The negative phase-sequence device 10 comprises a suitable core member 27 upon one leg of which a plurality of coils 28 and 29 are wound. A plurality of resistors 30 and 31 are connected to the respective outer ends of the coils 28 and 29 and also in circuit with the secondary windings of current transformers 32 and 33 which are associated with the load conductors 1ᵃ and 2ᵃ. A common conductor 34 serves to connect adjoining terminals of the secondary windings of the transformers 32 and 33 to the junction-point of the transformer coils 28 and 29. A resistor 35 is connected between the intermediate conductor 34 and the outer conductor that is associated with the resistor 30, while a combined resistor and reactor 36 serves to connect the intermediate conductor 34 with the outer conductor that is associated with the resistor 31. A secondary winding 37 is disposed upon another leg of the transformer core 27 for a purpose to be set forth.

The impedances 35 and 36 are equal and have such characteristics that the voltages across the same are 180° out of phase under balanced circuit conditions. Since the circuits of the transformer coils 28 and 29 contain the resistors 30 and 31, the currents traversing said coils are in phase with the voltages across the impedances 35 and 36. Under balanced circuit conditions, the coils 28 and 29 neutralize each other and, under unbalanced conditions, cooperate to energize the secondary winding 37 in accordance with the degree of unbalance of the currents in the load circuit.

As fully set forth in the above-identified copending application of Robert D. Evans, the devices 9 and 10 are respectively adapted to produce in the secondary windings 26 and 37, respectively, currents that correspond to the positive phase-sequence component of the voltage and to the negative phase-sequence component of the current in the load circuit, respectively.

These secondary currents are employed to energize the watt-meter device 11, which may be of any familiar type comprising a current coil 38, a voltage coil 39 and a movable element including a pointer 40.

The current coil 38 and the voltage coil 39 of the watt-meter device 11 are respectively connected directly to the secondary windings 37 and 26 of the devices 10 and 9. Consequently, the watt-meter device 11 is adapted to afford an indication of the unbalance of the load circuit, in accordance with the principles set forth in the above-identified copending applications.

The device 8 comprises two negative-phase-sequence devices 12 and 13 of the same character as the previously-described device 9, but connected on the load and supply sides of the reactors 4, 5 and 6. The secondary windings thereof are respectively connected to voltmeters 14 and 15. The movable elements of these voltmeters are mechanically connected by means of a common shaft or spindle 50, for example, one end of which is provided with a suitable pointer or contact member 51. The voltmeters 14 and 15 are thus adapted to be energized in accordance with negative-phase-sequence components of the voltage of the supply-side and the load-side, respectively, but are so mounted upon the spindle 50 as to oppose each other.

The balanced impedances 4, 5 and 6 serve to balance the voltages and currents of the circuit or to decrease the negative phase-sequence components present. If the load circuit is unbalanced and the supply circuit is balanced, the voltages across the supply end of the impedances 4, 5 and 6 are more nearly balanced than those across the load end of said impedances. The opposite condition obtains when the load circuit is more nearly balanced than the supply circuit.

Consequently, movement of the pointer 51 in the one or the other direction will serve to indicate whether or not the unbalance in the load circuit, which is indicated by the watt-meter device 11, is of such magnitude as to tend to correct or aggravate the degree of unbalance of the supply circuit, since the predominant negative-phase-sequence component, whether in the supply circuit or the load circuit, will cause the pointer 51 to be actuated in a corresponding direction.

Consequently, by the combination of the two devices described, the amount of unbalance in a load or customer's circuit is indicated by one instrument, namely, the watt-meter device 11, while the direction of such unbalance in the load circuit is indicated by the other portion 8 of the apparatus, whereby it may be determined whether the customer should pay a penalty for increasing the degree of unbalance of the supply circuit or should receive a bonus for decreasing the unbalance thereof.

The system shown in Fig. 2 corresponds to the system just described, with the exception of the substitution of a special indicating device 52 for the device 8.

In lieu of the secondary windings of the negative phase-sequence devices 12 and 13, the corresponding core members 53 and 54 are provided with an opening or magnetic gap within which wound armatures 56 and 58 are respectively located. The armatures 56 and 58 are connected in opposition by means of a common shaft or spindle 59, one end of which is provided with a pointer 60.

Consequently, the indication afforded by the pointer 60 corresponds exactly to that given by the pointer 51 in the system of Fig. 1. When the device 52 is combined with the device 7, the desired double indication, namely the degree of unbalance and the direction of such unbalance, is provided.

It will be seen that we have thus provided a measuring device and system whereby not only may the amount or degree of unbalance in a load or customer's circuit be determined but the direction of such unbalance, that is whether it tends to assist or oppose the unbalance of the supply circuit, is also indicated.

We do not wish to be restricted to the specific circuit connections or arrangement of parts herein set forth, as various modifications thereof may be effected without departing from the spirit and scope of our invention. We desire, therefore, that only such limitations shall be imposed as are indicated in the appended claims.

We claim as our invention:

1. The combination with a plurality of interconnected circuits, of means for indicating whether a load in one circuit tends to assist or oppose any unbalance in another circuit, said means comprising a plurality of oppositely-acting voltmeters.

2. The combination with a plurality of interconnected circuits, of means for indicating whether a load in one circuit tends to assist or oppose any unbalance in another circuit, said means comprising a plurality of electro-responsive means respectively energized in accordance with certain phase-sequence components of electrical quantities of said circuits.

3. The combination with a supply and a distribution circuit, of means for indicating whether a load in said distribution circuit tends to increase or decrease the degree of unbalance of said supply circuit, said means comprising a plurality of oppositely-acting electro-responsive devices respectively energized in accordance with counter-rotational components of a quantity of said circuits.

4. The combination with a plurality of inter-connected circuits, of means for indicating whether a load in one circuit tends to assist or oppose any unbalance in another circuit, said means comprising a pair of mechanically opposed voltmeters, respectively energized in accordance with the negative-phase-sequence components of voltage of said circuits.

5. The combination with a plurality of inter-connected circuits, of means for indicating whether a load in one circuit tends to assist or oppose any unbalance in another circuit, said means comprising a balanced impedance connected between the circuits and a plurality of voltage-responsive devices respectively energized in accordance with like phase-sequence components of voltage at the terminals of said impedance.

6. The combination with a supply and a distribution circuit, of means for indicating whether a load in said distribution circuit tends to increase or decrease the degree of unbalance of said supply circuit, said means comprising a balanced impedance connected between said circuits and a pair of mechanically opposed volt-meters respectively energized in accordance with the negative-phase-sequence components of the voltages at the terminals of said impedance.

7. The combination with a supply circuit, a distribution circuit and a reactor connected therebetween, of means comprising a plurality of oppositely-acting electro-responsive devices connected on opposite sides of the reactor for indicating the relative unbalance of said circuits.

8. The combination with a supply and a distribution circuit, of an electromagnetic device and means whereby said device is actuated in accordance with the relative unbalance of said circuits.

9. The combination with two circuits, of means responsive to the degree of unbalance of said circuits and an element actuated thereby in accordance with the relative unbalance of said circuits.

10. The combination with two circuits, of means comprising a negative phase-sequence voltmeter for indicating the relative unbalance of said circuits.

In testimony whereof, we have hereunto subscribed our names this 19th day of December, 1921.

CHARLES LE G. FORTESCUE.
ROBERT D. EVANS.